US008639791B2

(12) United States Patent
Carter et al.

(10) Patent No.: US 8,639,791 B2
(45) Date of Patent: Jan. 28, 2014

(54) TECHNIQUES FOR EVALUATING AND MANAGING CLOUD NETWORKS

(75) Inventors: Stephen R Carter, Spanish Fork, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 342 days.

(21) Appl. No.: 12/783,615

(22) Filed: May 20, 2010

(65) Prior Publication Data

US 2011/0289440 A1 Nov. 24, 2011

(51) Int. Cl.
*G06F 15/173* (2006.01)

(52) U.S. Cl.
USPC ........... 709/223; 709/224; 717/103; 717/168; 718/104; 718/106

(58) Field of Classification Search
None
See application file for complete search history.

(56) References Cited

U.S. PATENT DOCUMENTS

| | | | |
|---|---|---|---|
| 6,625,453 B1 | 9/2003 | Dai et al. | |
| 7,693,766 B2 | 4/2010 | Horowitz | |
| 7,783,543 B2 | 8/2010 | Horowitz | |
| 2008/0080396 A1 | 4/2008 | Meijer et al. | |
| 2008/0147866 A1 | 6/2008 | Stolorz | |
| 2009/0300423 A1 | 12/2009 | Ferris | |
| 2009/0300608 A1 | 12/2009 | Ferris et al. | |
| 2010/0027552 A1 | 2/2010 | Hill | |
| 2010/0030866 A1 | 2/2010 | Bedi | |
| 2010/0050172 A1* | 2/2010 | Ferris ............................... 718/1 |
| 2010/0061250 A1 | 3/2010 | Nugent | |
| 2010/0125664 A1* | 5/2010 | Hadar et al. .................. 709/224 |
| 2010/0281151 A1 | 11/2010 | Ramankutty | |
| 2010/0332401 A1* | 12/2010 | Prahlad et al. .................. 705/80 |
| 2011/0119370 A1* | 5/2011 | Huang et al. .................. 709/224 |
| 2011/0138049 A1* | 6/2011 | Dawson et al. ............... 709/226 |
| 2011/0231899 A1* | 9/2011 | Pulier et al. ....................... 726/1 |
| 2011/0289198 A1 | 11/2011 | Isaacson et al. | |

OTHER PUBLICATIONS

Begnum, Kyrre, et al., "Cloud-Oriented Virtual Machine Management with MLN", Cloud Computing, 5931, (Dec. 1, 2009), 12 pgs.
Gaisbauer, Sebastian, et al., "VATS: Virtualized-aware Automated Test Service", Quantitative Evaluation of Systems, 5th Annual International Conference IEEE, (Sep. 14, 2008), 93-102.
Sobel, Will, "Cloudstone: Multi-Platform, Multi-Language Benchmark and Measurement Tools for Web 2.0", [Online]. Retrieved from the Internet: <http://citeseerx.ist.psu/viewdoc/download?doi=10.1.1.163.7403&rep=rep1&type=pdf>, (Accessed Aug. 16, 2011), 6 pgs.

* cited by examiner

*Primary Examiner* — Mohamed Ibrahim
(74) *Attorney, Agent, or Firm* — Schwegman Lundberg & Woessner, P.A.

(57) ABSTRACT

Techniques for evaluating and managing cloud networks are provided. Geographical locations for cloud processing environments are combined with attributes and usage metrics to form associations between each cloud processing environment's geographical location and that cloud's corresponding attributes and usage metrics. A map is organized for the associations to form a cloud network. The map is dynamically updated, supplied to services, and rendered for evaluation of the cloud network.

20 Claims, 5 Drawing Sheets

TECHNIQUES FOR EVALUATING AND MANAGING CLOUD NETWORKS

BACKGROUND

Enterprises are finding it increasingly difficult to stay abreast with the rapidly evolving technology platforms. That is, software and hardware upgrades are commonplace for an information technology (IT) infrastructure of an enterprise and maintaining a state of the art infrastructure is costly, time consuming, and distracts from the business of an enterprise. But, there is no avoiding technology and the enterprise's business is intimately dependent on its underlying infrastructure. So, an enterprise is in a catch-22 position and is forced to maintain a costly IT infrastructure.

To remedy these concerns a new technology has been gaining acceptance in the industry. This technology is referred to as "cloud computing." The term "cloud" is used as a metaphor for how the Internet is depicted in diagrams and is used as an abstraction of the underlying infrastructure, which is being concealed with cloud computing. Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction.

With cloud computing and cloud storage, enterprises are recognizing an economy of scale in migrating portions of their data centers to various cloud providers. Infrastructure as a Service (IaaS) is currently the most common mechanism for providing cloud computing and storage. Software as a Service (SaaS) and Platform as a Service (PaaS) are focused more on providing specific services or specific platform services rather than raw infrastructure.

One of the concerns that the cloud services provider are likely to face as cloud services and cloud infrastructure become more important to enterprise users is the issue of service-level agreements (SLA's). Anyone paying for a service has an expectation that the service will be operated so as to meet their needs. These needs not only include security and stability but also include responsiveness and accessibility. Typically, responsiveness is directly related to the location of the end user and the cloud services that the end-user will be utilizing.

While geography plays a part in this, more important is the state of a network in relation to the user and the cloud services. So, because of the way the network is set up, processes may be more advantageously located (for responsiveness) in locations that are not geographically close. Furthermore, because of the nature of the Internet and the anticipated cloud service providers operating on the Internet, it is important to not only acquire the state of the network in relation to geography but also to maintain that state so that it is constantly up to date. This type of maintenance of the network state will become more important as more and more cloud services providers instantiate clouds in different geographic locations so as to provide more responsive services to their customers, disaster recovery, etc.

SUMMARY

In various embodiments, techniques for evaluating and managing cloud networks are presented. More specifically, and in an embodiment, a method for evaluating and managing a cloud network is provided. Specifically, geographical data, attribute data, and any previously obtained usage metric data are acquired for a cloud processing environment. Next, the geographical data, the attribute data, and the previously obtained usage metric data are evaluated to create a plan for testing the cloud processing environment with test data. The cloud processing environment when tested with the test data produces new usage metric data. A state or an existing state of the cloud processing environment is recorded or updated, when the cloud processing environment is tested with the test data. The state or the updated existing state represents an association between the geographical data, the attribute data, the previously obtained usage metric data, and the new usage metric data. Furthermore, the state or the updated existing state is subsequently used to make real-time or dynamic decisions for services associated with the cloud processing environment.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

The phrase "cloud network" refers to a network of cloud processing environments logically being managed as a single collective network.

The term "Netgraphy" is used herein to indicate the state of a cloud network, such that messages and packets traveling between processes, storage, and end users can be affected, monitored, and altered.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-5.

Figure 1:
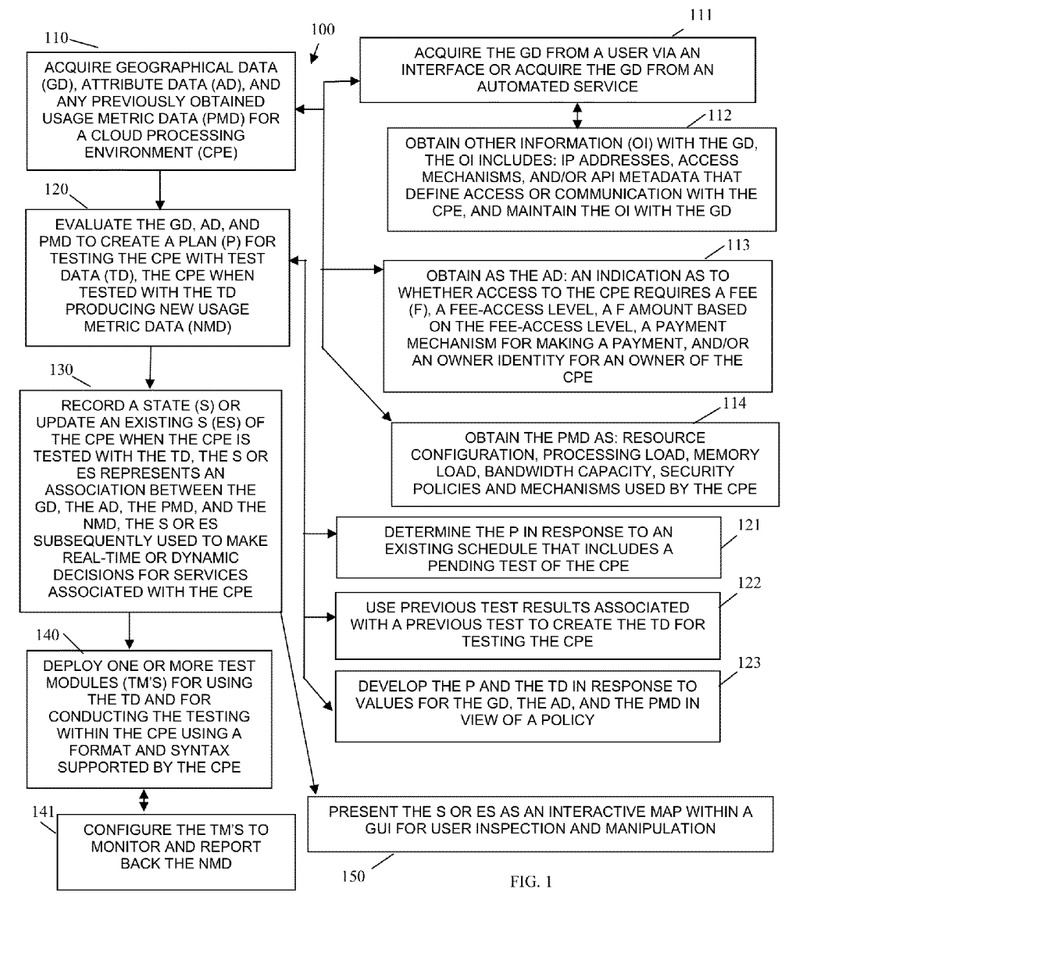
FIG. 1 is a diagram of a method for evaluating and managing a cloud network, according to an example embodiment.

FIG. 1 is a diagram of a method 100 for evaluating and managing a cloud network, according to an example embodiment. The method 100 (hereinafter "cloud network manager") is implemented in a machine-accessible and computer-readable medium and instructions that execute on one or more processors (machines, computers, processors, etc.). The machine is specifically configured to process the cloud network manager. Furthermore, the cloud network manager is operational over and processes within a network. The network may be wired, wireless, or a combination of wired and wireless.

At 110, the cloud network manager acquires geographical data, attribute data, and any previously obtained usage metric data for a cloud processing environment. The geographical data includes a geographical location or position for endpoint connections (routers, gateways, proxies, etc.) to the cloud processing environment. The attribute data can include such that as configuration settings, licensing restrictions, policy identifiers, resource identifiers, etc. The previously obtained usage metric data includes things such as processor load, memory load, number of resources, etc.

According to an embodiment, at 111, the cloud network manager acquires the geographical data from a user via an interface. In an alternative approach, at 111, the cloud network manager acquires the geographical data from an automated service via an Application Programming Interface (API).

Continuing with the embodiment of 111 and at 112, the cloud network manager obtains other information with the geographical data. The other information includes such things as: Internet Protocol (IP) addresses, access mechanisms, and/or API metadata, which defines access or communication with the cloud processing environment. Here, the other information can be maintained with the geographical data. In some cases, the data (other information) is for endpoint resources for accessing the cloud processing environment, such as routers, proxies, etc.

In a scenario, at 113, the cloud network manager obtains the attribute data as: an indication as to whether access to the cloud processing environment requires a fee, fee-access level, a fee amount based on the fee-access level, a payment mechanism for making payment for the fee, and/or owner identity for an owner of the cloud processing environment. Any fee can be based on subscriptions levels. So, a higher bandwidth might be associated with a particular fee-access level or subscription level and require a higher fee. In some cases, fees are waived for purposes of acquiring the usage metric data based on agreements between owners or providers of cloud processing environments to share such information collectively.

In another case, at 114, the cloud network manager obtains the previously obtained usage metric data as: resource configuration settings, processing load, memory load, bandwidth capacity, security policies and mechanisms used by the cloud processing environment.

At 120, the cloud network manager evaluates the geographical data, the attribute data, and the previously obtained metric usage data to create a plan for testing the cloud processing environment with test data. The cloud processing environment when tested with the test data produces new usage metric data. Here, policies and profiles can be used to evaluate the data, for scheduling the test, and for selecting a particular test or for assembling test data for the cloud processing environment.

For example, at 121, the cloud network manager determines the plan for testing based on or in response to an existing schedule that includes a pending test for the cloud processing environment. In other words, there may already be some pending tests for the cloud processing environment that the cloud network manager needs to account for when scheduling the testing. In some cases, policy may trump existing schedules, such that the testing desired by the cloud network manager takes precedence over any pending test.

In an embodiment, at 122, the cloud network manager uses previous test results associated with a previous test to create the test data for the testing of the cloud processing environment. That is, some previous tests may have determined that when a particular resource was used the expected bandwidth results were poor; when the results of the previous tests are evaluated the cloud network manager creates test data to look more closely or retest that particular resource. By evaluating the previous test results, the cloud network manager can create a dynamic feedback loop for testing resources of the cloud processing environment and to focus on areas or resources that appear to be problematic to isolate problems. This is done in an automated manner and achieved without user intervention.

According to an embodiment, at 123, the cloud network manager develops the plan for testing and the test data based on or in response to values for the geographical data, the attribute data, and the previously obtained metric usage data in view of a policy. That is, the policy defines conditions that include values for the information listed above and then actions for planning and assembling the test data are defined when specific conditions are met or not met.

At 130, the cloud network manager records a state or updates an existing state for the cloud processing environment when the cloud processing environment is tested with the test data. The state or updated stated is the Netgraphy described above and is a relationship (linkage and association) between the geographical data, the attribute data, the previous obtained metric usage data, and the new metric usage data. This Netgraphy (state or updated existing state)

detail is then subsequently used to make real-time or dynamic decisions for services associated with the cloud processing environment. A variety of decisions can be made, such as to migrate one or more services from one cloud to another, to shut down some services for a cloud, to move requests for services to another cloud for action, and the like.

According to an embodiment, at 140, the cloud network manager deploys one or more test modules for using the test data and for conducting the testing within the cloud processing environment using a format and syntax supported by the cloud processing environment. The test modules are agents that are processing within the cloud processing environment, so they are provide in the format and syntax necessary for those agents to execute in the cloud processing environment.

Continuing with the embodiment of 140 and at 141, the cloud network manager configures the test modules to monitor and report back the new metric usage data to the cloud network manager. So, once the test modules are pushed and installed in the cloud processing environment. Information for the metric usage data and for configuring the test modules in a dynamic fashion can be pulled by the cloud network manager (or the configuration can cause the test modules to push the data to the cloud network manager on predefined events or at predefined intervals).

In another case, at 150, the cloud network manager presents the state or the updated existing state (Netgraphy) as an interactive map within a Graphical User Interface (GUI) for user inspection and manipulation. Here, the cloud processing environment along with other cloud processing environments can be depicted on a geographical map based on each cloud's physical location. The attributes and metrics are then overlaid on top of the physical locations. The map is interactive because a level of detail exposed on the map at any one time can be user directed.

Figure 2:
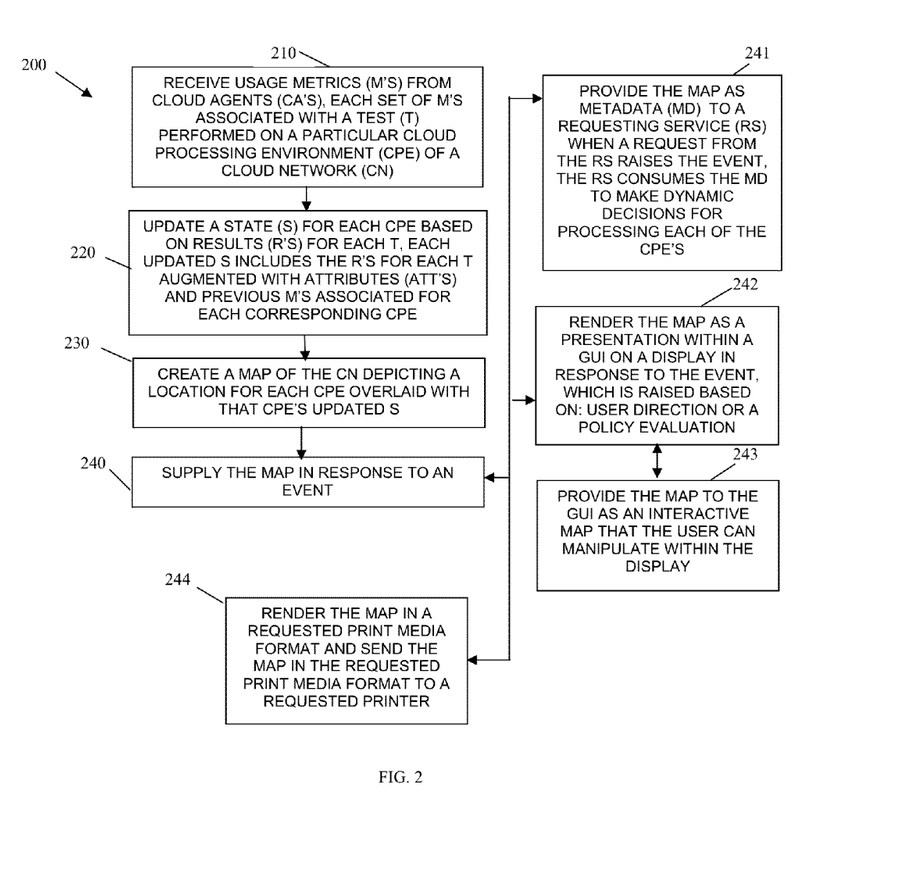
FIG. 2 is a diagram of another method for evaluating and managing a cloud network, according to an example embodiment.

FIG. 2 is a diagram of another method 200 for evaluating and managing a cloud network, according to an example embodiment. The method 200 (hereinafter "cloud evaluator") is implemented in a machine-accessible and computer-readable storage medium as instructions that execute on one or more processors of a network node. The cloud evaluator is operational over a network. The network may be wired, wireless, or a combination of wired and wireless. Furthermore, the processor is specifically configured to process the cloud evaluator.

At 210, the cloud evaluator receives usage metrics from cloud agents. Each set of usage metrics associated with a test performed on a particular cloud processing environment of a cloud network (multiple logically organized cloud processing environments).

At 220, the cloud evaluator updates a state for each cloud processing environment based on results for each test. Each updated state includes the results for each test augmented with attributes and previously obtained usage metrics associated for each cloud processing environment.

At 230, the cloud evaluator creates a map of the cloud network that depicts a physical and geographical location for each cloud processing environment, which is overlaid with that particular cloud processing environment's updated state as discussed above in 220. The linkage between the physical location of a cloud processing environment along with that cloud's attributes, and usage metrics (test results) combines to form a Netgraphy for that particular cloud processing environment.

At 240, the cloud evaluator supplies the map in response to an event. That is, the map can be used for a variety of beneficial purposes and can be supplied in a desired format and to a desired resource based on policy that is evaluated based on a particular detected event.

For example, at 241, the cloud evaluator provides the map as metadata to a requesting service when a request from the requesting service raises the event. The requesting service then consumes the metadata to make dynamic decisions for each of the cloud processing environments within the cloud network.

In another case, at 242, the cloud evaluator renders the map as a presentation within a GUI on a display in response to the event. Here, the event is raised based on either user direction or a particular policy evaluation.

Continuing with the embodiment of 242 and at 243, the cloud evaluator provides the map to the GUI as an interactive map that the user can manipulate within the display. So, the user can highlight clouds (geographically) and request a specific level of detailed information. The user may even request updated test results and evaluation in a dynamic fashion (assuming policy permits).

In another situation, at 244, the cloud evaluator renders the map in a requested print media format and sends the map in the requested print media format to a requested printer for print output to a print media.

So, the map forms the Netgraphy of the clouds within the cloud network and the map can be automatically analyzed as a data structure that drives processing; the map can be custom presented to a user for manipulation, analysis, and evaluation; and/or the map can be custom printed in requested format for subsequent analysis and evaluation.

Figure 3:
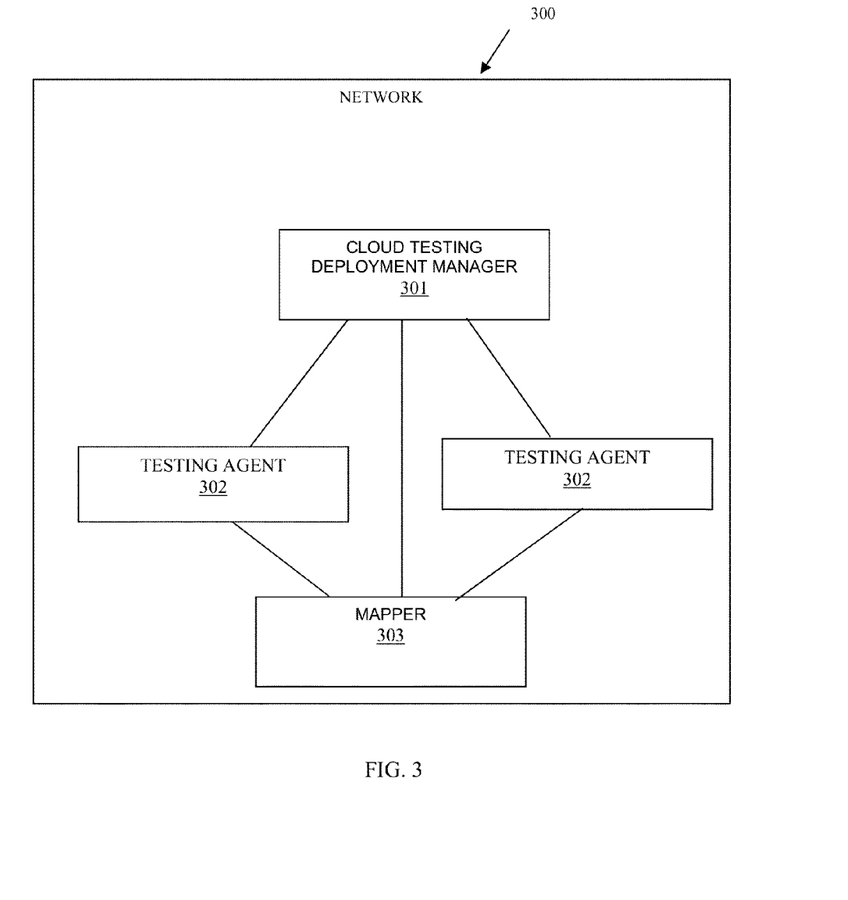
FIG. 3 is a diagram of a cloud network evaluation and management system, according to an example embodiment.

FIG. 3 is a diagram of a cloud network evaluation and management system 300, according to an example embodiment. The cloud network evaluation and management system 300 is implemented in a machine-accessible and computer-readable storage medium as instructions that execute on one or more processors (multiprocessor) and that is operational over a network. The one or more processors are specifically configured to process the components of the cloud network evaluation and management system 300. Moreover, the network may be wired, wireless, or a combination of wired and wireless. In an embodiment, the cloud network evaluation and management system 300 implements, among other things, certain aspects of the methods 100 and 200 represented by the FIGS. 1 and 2, respectively.

The cloud network evaluation and management system 300 includes a cloud testing deployment manager 301, a plurality of testing agents 302, and a mapper 303. Each of these and their interactions with one another will now be discussed in turn.

The cloud testing deployment manager 301 is implemented in a non-transitory computer-readable storage medium and executes on one or more processors of the network. Example processing associated with the cloud testing deployment manager 301 was discussed above with reference to the method 100 of the FIG. 1.

The cloud testing deployment manager 301 is configured to configure and deploy each of the testing agents 302 to a particular cloud processing environment.

In an embodiment, the cloud testing deployment manager 301 is configured to develop the tests and test data for the tests in response to attributes, geographical locations, previous results from previous tests, and policies.

In another embodiment, the cloud testing deployment manager 301 is configured to schedule the tests in response to existing schedule data for existing schedules that conduct tests in each of the cloud processing environments.

Each testing agent 302 is implemented in a non-transitory computer-readable storage medium and executes on one or more processors of the network. Example features associated with the testing agents 302 were discussed above with reference to the methods 100 and 200 of the FIGS. 1 and 2, respectively.

Each testing agent 302 is configured to run or execute the tests created by the cloud testing deployment manager 301. Each testing agent 302 is also configured to report on the results from the tests back to the mapper 303.

The mapper 303 is implemented in a non-transitory computer-readable storage medium and executes on one or more processors of the network. Example features of the mapper 303 were presented above with reference to the method 200 of the FIG. 2.

The mapper 303 is configured to associate each set of test results to a particular geographical location for a particular cloud processing environment along with attributes for that particular cloud processing environment for purposes of producing a map. The map is to be subsequently consumed or used for evaluations of a cloud network. The cloud network includes each of the cloud processing environments.

In an embodiment, the mapper 303 is configured to provide the map as one or more of: input data to a cloud managing service, one or more database tables forming a relational database, and/or a GUI presentation.

According to an embodiment, the mapper 303 is configured to provide the map to the cloud testing deployment manager 301 creating a dynamic and real-time feedback loop that is used for testing and evaluating the entire cloud network.

Figure 4:
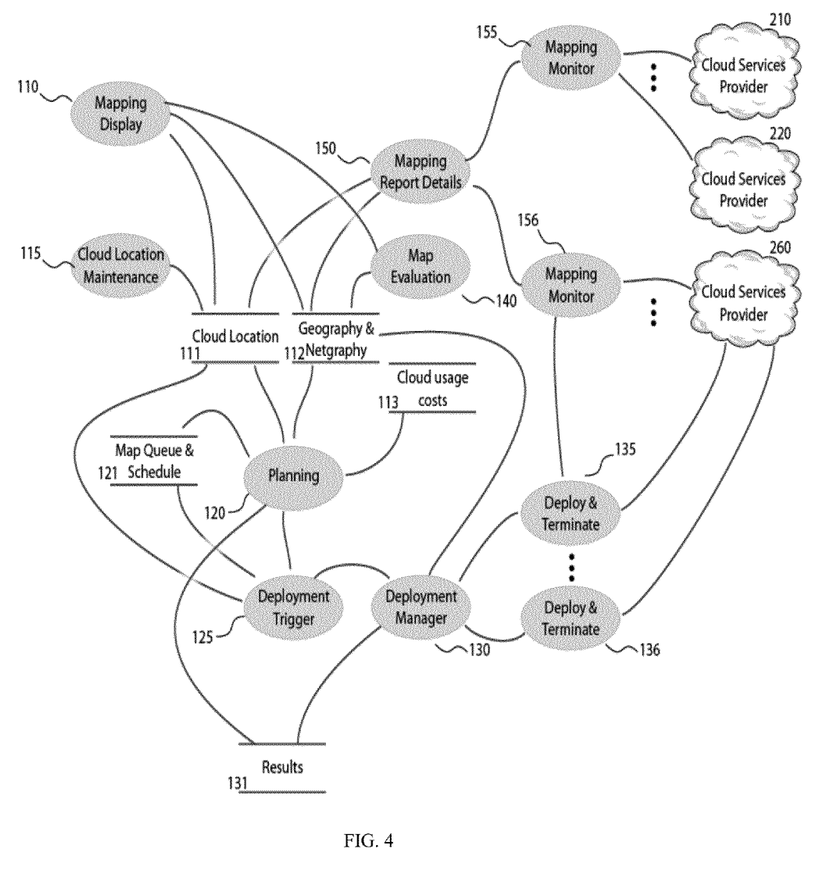
FIG. 4 is a diagram of a cloud architecture that uses the techniques presented herein.

FIG. 4 is a diagram of a cloud architecture that uses the techniques presented herein. The components of the FIG. 4 are implemented in a non-transitory computer-readable or processor-readable storage medium and execute on one or more processors specifically configured to perform the techniques discussed herein and below.

Embodiments of the FIG. 4 proceed as follows.

A cloud location description is provided, at 111, and is entered via some mechanism, such as is shown at 115 (this could come either from manual entry or from an automated service). Acquisition of cloud locations can occur in any manner, but some embodiments presented herein rely on external mechanisms, such as automated mechanisms or manual entry for purposes of maintaining some list of clouds and their locations geographically. Also access mechanisms, Internet Protocol (IP) addresses, Application Programming Interface (API) metadata, etc. are maintained in 111 via 115 so that the Netgraphy of the various clouds is ascertained.

The planning process of 120 accesses the information at 111 and, for new locations, prepares initial records of 112 for the correlation of geography and Netgraphy along with the accompanying responsiveness metrics for the Netgraphy. Other information may also be logged concerning the Netgraphy, such as cloud usage costs, cloud ownership, common access mechanisms (such as standard router configurations), enhanced access mechanisms (such as a subscription-based router configuration that provide higher speed network access). The planning mechanism at 120 plans the sequencing of the testing of the cloud location based on the information in 113, which provides cloud usage costs, any previous information at 112, and any pending scheduled processes for ascertaining Netgraphy at 121. In an embodiment, it is anticipated that some cloud providers in 113 have entered into an agreement with the enterprises acquiring and maintaining the Netgraphy so as to provide a zero cost access to clouds supported by the specific cloud provider in return for the sharing of Netgraphy information. In other embodiments, the access to Netgraphy information is by subscription so that the costs realized by obtaining the Netgraphy information are offset, as per information and 113.

The deployment trigger process, at 125, uses the information at 121 to communicate with deployment manager at 130 so that Netgraphy agents can be deployed to the various cloud services providers and so that active elements are in place at the cloud services providers to respond to test traffic for purposes of ascertaining the Netgraphy. The process, at 125, may receive a trigger from 111 or 115 as information is entered into the cloud location as either a modification or new cloud location information. Likewise, in an embodiment trigger information is provided by the planning function 120 and the schedule at 121 is completed. The planning module, at 120, also uses results from previous Netgraphy agents, at 131, to determine the appropriate scheduling. This is especially important if the results in 131 are showing failures as a result of certain access problems such as IP addresses. In this case, the planning module requests information externally for the correction of the erroneous information (e.g., the IP address), which is then be corrected via 115 in 111.

The deployment trigger then spawns the deployment manager or notifies the deployment manager at 130, which then makes requests of the deployment manager and terminates modules at 135 and 136. The modules, at 135 and 136, represent a plurality of processes that are written specific to the API or deployment mechanisms for certain cloud providers, such as 210, 220, and 260. As Netgraphy agents are deployed, information is sent from 135 and 136 to 156 to allow for the monitoring of those agents and the reporting of the monitoring information from 156 to 150. This monitoring is provided in an embodiment to allow operations' personnel to verify the correct processing of Netgraphy agents.

As Netgraphy agents complete, determination information is received by 135 and 136 and reported back to 130, which is logged in 131. The deployment manager, at 130, and the planning module 120 both can conduct evaluations to log appropriate information in 112, so that the correlation between geography and Netgraphy along with the responsiveness of the Netgraphy access can be noted. In an embodiment, the raw results of 131 are also available for other types of analysis, such as statistical analysis, which allows for the development of other router configurations, which may provide more advantageous cloud infrastructures.

The map evaluation process at 140 is accessing the geography of Netgraphy information 112 to provide final evaluation of the geography in relation to the Netgraphy. This evaluation is stored back in 112 and is available as the summarized or evaluated information concerning the entire Netgraphy agent reporting. This map evaluation may be displayed on a map, displayed in one embodiment, at 110, via either information from 140 or 112.

In an embodiment, a matching report provides the details from the matching monitors, at 111 and 112, so as to provide information between the deployment and termination of a Netgraphy agent running at a cloud provider, such as at 210, 220, and 260. It is well to note that there is a plurality of cloud services providers and that the three shown in the FIG. 4 is used only as a convenient number for discussion.

The final mapping display, at 110, provides cloud location information, geography information, and Netgraphy information in a variety of display formats both pictorially, textually, and/or tabular format.

Figure 5:
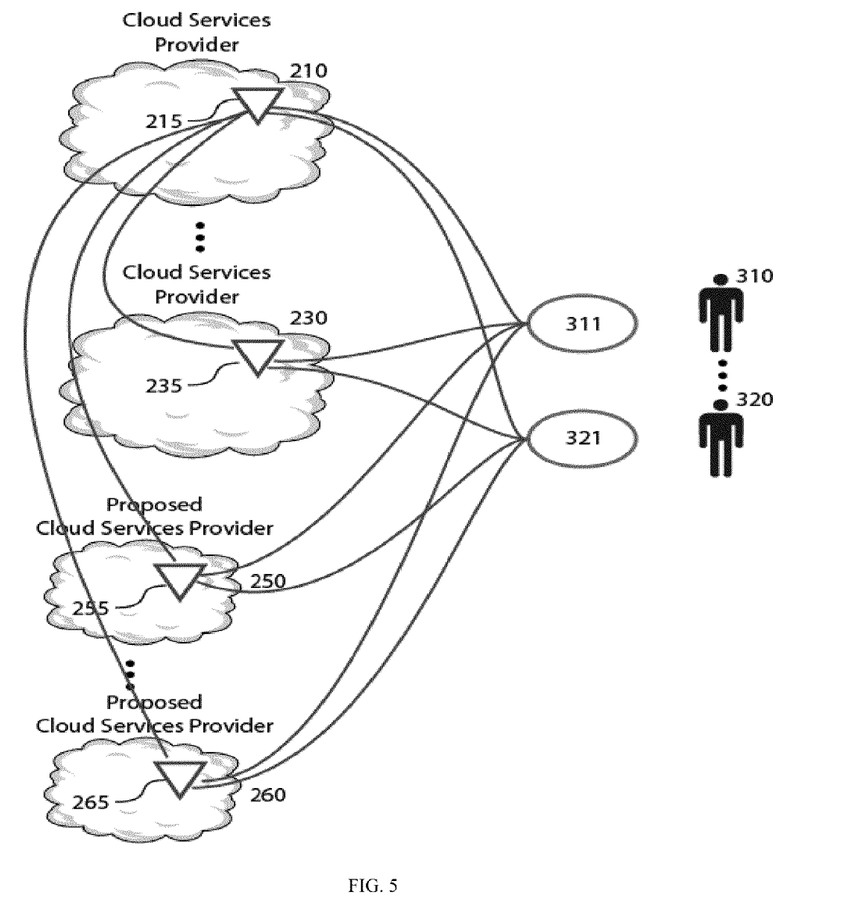
FIG. 5 is a diagram depicting the processing of Netgraphy agents or services, according to an embodiment of the invention.

FIG. 5 is a diagram depicting the processing of Netgraphy agents or services, according to an embodiment of the invention. The Netgraphy agents or services are implemented in non-transitory computer-readable or processor-readable storage medium as instructions that are executed on one or more processors of a network and the processors are specifically configured to perform the processing of the Netgraphy agents.

The Netgraphy agents shown at 215, 235, 255, and 265, are running (executing) in the associated cloud services provider at 210, 230, 250, and 260, respectively. It is significant that the Netgraphy agents are configured to: measure responsiveness, measure the number of hops, measure the error rate, measure other costs, etc. in a manner that provides the information needed to create a Netgraphy map. This may involve an N×N (where N is a positive Integer greater than 0) evaluation of all connections, such as is shown in the FIG. 5 between 215 and 235, 255, and 265. Of course if all of the connections were shown for this N×N evaluation, then there are also other connections between e.g., 235 and 215, 255, 265, etc. The planning module, at 120, has the information necessary to plan for the type of testing that needs to take place, so that there are testing strategies, which are more advantageous than just an N×N testing strategy.

In an embodiment, endpoints are provided and shown at 310 and 320, which have processes shown as 311 and 321, respectively, to provide Netgraphy metrics between endpoints and the cloud services' Netgraphy agents. This type of testing provides the responsiveness from endpoints outside of the cloud and is significant for the planning necessary to assure service-level agreement compliance. Traditionally, providing such an agent as 311 and 321 as a user endpoint is problematic. However, there are many endpoint agents available today that could profitably be used such as e.g., Digital Subscriber Line (DSL) reports and search clients, such as is provided by Google®. So, in addition to specialized Netgraphy agents, existing utilities, such as was stated before can be used to provide the network traffic necessary for the Netgraphy agent to measure response time for accessing an endpoint.

In an embodiment, the Netgraphy agents at 311 and 321 are triggered by an external mechanism, so that testing is performed when the user is not utilizing the equipment that hosts the Netgraphy agent. In another embodiment, the Netgraphy agent runs in the background. In another embodiment, the Netgraphy agent runs of a part of another service such as DSL reports or a search engine client. If the Netgraphy agent is able to be connected with something as prevalent as a search engine, then the information gleaned by the Netgraphy agents concerning endpoint responsiveness is valuable indeed, because of the many tens of thousands and hundreds of thousands of measurements at unique locations that can be acquired.

In an embodiment the geographic map is augmented with notations concerning threats associated with geographic location; for example, tornado corridor, fault lines, floodplains, etc. In an embodiment, these notations are augmented with temporal indicators so that, for example, tornado season is annotated with a beginning and end date. In yet another embodiment, an annotation, such as tornado season, is a continuum where the probability of a tornado in that specific tornado corridor is noted in some kind of temporal range boundary (e.g., from date #1 to date #2 there is a 20% chance, from date #2 to date #3 there is a 50% probability, etc.). In an embodiment these probabilities, temporal constraints, temporal ranges are acquired from historical data.

In another embodiment the geographic annotations are augmented with feeds from monitoring stations (such as seismic activity from seismic monitoring stations, tornado activity from tornado monitoring stations, etc.). In this way, the noted probability can be augmented by real-time or near real-time information.

In another embodiment, the selection of a Netgraphy location is influenced by these geographic augmentations and notations. In this case, the best and second-best Netgraphy location changes over time depending upon temporal constraints, real-time and near real-time input, and other geographic annotation and information.

In embodiment, the conjunction of Netgraphic and geographic information with the aforementioned augmentations provide for better selection concerning disaster recovery sites, best location, second-best location, etc. In this case, if the system notes that an Service Level Agreement (SLA) is no longer in compliance or is approaching noncompliance, a better location can be chosen with much more information concerning the likelihood of success in migrating or moving workloads to the new location. For example, network traffic may become congested because of weather related issues and a former second-best location may no longer be acceptable because it is in the same floodplain. In this case, geographic threats are taken into account concerning geographic location and current weather and flood monitoring stations and chooses a better second location, which would not be in that same floodplain.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium that is executed by one or more processors of a network to perform the method, comprising:

acquiring geographical data, attribute data, and any previously obtained usage metric data for a cloud processing environment;

evaluating the geographical data, the attribute data, and the previously obtained usage metric data to create a plan for testing the cloud processing environment with test data, the cloud processing environment when tested with the test data producing new usage metric data, the geographic data representing geographic positions for endpoint connections of the cloud processing environment, the attribute data representing configuration settings for resources of the cloud processing environment, licensing restrictions for those resources, policy identifiers for policies to enforce against the resources, and resource identifiers for the resources, the endpoint connections representing routers, gateways, and proxies for the cloud processing environment; and recording a state or updating an existing state of the cloud processing environment when the cloud processing environment is tested with the test data, the state or the updated existing state representing an association between the geographical data, the attribute data, the previously obtained usage metric data, and the new usage metric data, the state or the updated existing state subsequently used to make real-time or dynamic decisions for services associated with the cloud processing environment and the state or the updated state detailing how messages and packets traveling between processes, storage, and end users of the cloud processing environment are affected, monitored, and altered.

2. The method of claim 1, wherein acquiring further includes acquiring the geographical data from a user via an interface or acquiring the geographical data from an automated service.

3. The method of claim 2, wherein acquiring further includes obtaining other information with the geographical data, the other information including one or more of: Internet Protocol (IP) addresses for the cloud processing environment, endpoints of the cloud processing environment, or the resources of the cloud processing environment; access mechanisms used by the cloud processing environment; and Application Programming Interface (API) metadata defining access or communication with the cloud processing environment or the resources, and maintaining the other information with the geographical data.

4. The method of claim 1, wherein evaluating further includes developing the plan and the test data in response to values for the geographical data, the attribute data, and the previously obtained usage metric data in view of a policy.

5. The method of claim 4 further comprising, deploying one or more test modules for using the test data and for conducting the testing within the cloud processing environment using a format and syntax supported by the cloud processing environment.

6. The method of claim 5 further comprising, configuring the one or more test modules to monitor and report back the new usage metric data.

7. The method of claim 1, wherein acquiring further includes obtaining as the attribute data one or more of the following: an indication as to whether access to the cloud processing environment or a resource of the cloud processing environment requires a fee, a fee-access level when a fee is present, a fee amount based on the fee-access level when the fee is present, a payment mechanism for making a payment when the fee is present, and an owner identity for an owner of the cloud processing environment.

8. The method of claim 1, wherein acquiring further includes obtaining the previously obtained usage metrics data as one or more of the following: resource configuration for the cloud processing environment, processing load for the cloud processing environment, memory load for the cloud processing environment, bandwidth capacity for the cloud processing environment, security policies and mechanisms used by the cloud processing environment.

9. The method of claim 1, wherein evaluating further includes determining the plan in response to an existing schedule that includes a pending test of the cloud processing environment.

10. The method of claim 1, wherein evaluating further includes using previous test results associated with a previous test to create the test data for testing the cloud processing environment.

11. The method of claim 1 further comprising, presenting the state or the updated existing state as an interactive map within a graphical user interface for user inspection and manipulation.

12. A method implemented and residing within a non-transitory computer-readable storage medium that is executed by one or more processors of a network to perform the method, comprising:

receiving usage metrics from cloud agents, each set of metrics associated with a test performed on a particular cloud processing environment of a cloud network;

updating a state for each cloud processing environment based on results for each test, each updated state including the results for each test augmented with attributes and previous usage metrics associated for each corresponding cloud processing environment;

creating a map of the cloud network depicting a location for each cloud processing environment overlaid with that cloud processing environment's updated state, wherein a user controls an exposed level of detail provided via the map at any point in time; and supplying the map in response to an event.

13. The method of claim 12, wherein supplying further includes rendering the map as a presentation within a graphical user interface (GUI) on a display in response to the event, which is raised based on: the user direction or a policy evaluation.

14. The method of claim 13, wherein rendering further includes providing the map to the GUI as an interactive map that the user can manipulate within the display.

15. The method of claim 12, wherein supplying further includes providing the map as metadata to a requesting service when a request from the requesting service raises the event, the requesting service consuming the metadata to make dynamic decisions for processing each of the cloud processing environments.

16. The method of claim 12, wherein supplying further includes rendering the map in a requested print media format and sending the map in the requested print media format to a requested printer.

17. A multiprocessor-implemented system, comprising:

a cloud testing deployment manager implemented in a non-transitory computer-readable storage medium and to execute on one or more processors of a network;

a plurality of testing agents implemented in a non-transitory computer-readable storage medium and to execute on one or more processors of the network; and a mapper implemented in a non-transitory computer-readable storage medium and to execute on one or more processors of the network;

wherein the cloud testing deployment manager is configured to configure and deploy each of the testing agents to a particular cloud processing environment, the testing agents configured to run tests and gather usage metrics from the tests and to further report results from the tests to the mapper, the mapper configured to associate each set of results to a particular geographical location for a particular cloud processing environment along with attributes for that particular cloud processing environment for purposes of producing a map, the map is to be subsequently used for evaluations of a cloud network comprising each of the cloud processing environments, wherein a user controls an exposed level of detail via the map at any point in time and the map is interactive.

18. The system of claim 17, wherein the cloud testing deployment manager is configured to develop the tests and test data for the tests in response to the attributes, the geographical locations, previous results from previous tests, and policies.

19. The system of claim 17, wherein the cloud testing deployment manager is configured to schedule the tests in response to existing schedule data.

20. The system of claim 17, wherein the mapper is configured to provide the map as one or more of: input data to a cloud managing service, one or more database tables forming a relational database, and a graphical user interface presentation.

* * * * *